July 23, 1963 H. R. FOSTER ETAL 3,098,981

FREQUENCY MODULATED CRYSTAL OSCILLATOR

Filed Oct. 10, 1958

INVENTORS
Harry R. Foster
Elmo E. Crump
BY
Munn, Liddy, Daniels & March
ATTORNEYS 3,098,981
FREQUENCY MODULATED CRYSTAL OSCILLATOR Harry R. Foster, Montville, and Elmo E. Crump, West Caldwell, N.J., assignors to Ohmega Laboratories, Pine Brook, N.J., a corporation of New Jersey
Filed Oct. 10, 1958, Ser. No. 766,480
8 Claims. (Cl. 332—26)

This invention relates to television testing equipment, and more particularly to signal generators adapted to produce both video and audio signals for use in the checking, testing, and repairing of television receivers and similar equipment.

An object of the present inevntion is to provide a novel and improved television sound and picture signal generator which will provide a useful and advantageous frequency-modulated signal with the use of but relatively few components of simple construction, incorporated in a simplified circuit or arrangement.

A further object of the invention is to provide an improved signal generator device for television testing and servicing purposes, which produces by means of simple components and circuitry as above said forth a frequency-modulated signal of relatively high quality, which signal further may be proportional to an audio-frequency input signal generated either externally or else by an audio-oscillator portion of the said generator.

An additional object of the invention is to provide in a signal-generator as above characterized an improved oscillator device for producing frequency-modulated signals, said oscillator device being relatively small and compact in its physical dimensions and structure, and being also of relatively light weight.

Yet another object of the invention is to provide, for use in a television signal generator as above defined, a novel and improved crystal-controlled oscillator by which, through the use of relatively few and simple components there may be produced a high-quality frequency-modulated signal in response to excitation by an audio frequency signal of predetermined fixed frequency.

A still further object of the invention is to provide, in a television signal generator, a novel and simplified crystal-controlled oscillator having in combination with electron discharge devices crystal diodes or transistors, for the purpose of generating frequency-modulated signals for use with television equipment.

Another object of the invention resides in the provision of an oscillator having a novel, variable-impedance means constituted of a conductive crystal device such as a diode or transistor, disposed in series with a piezo-electric crystal to effect amplification and frequency modulation of an impressed audio-frequency signal.

Other features and advantages will hereafter appear.

Figures 1, 2:
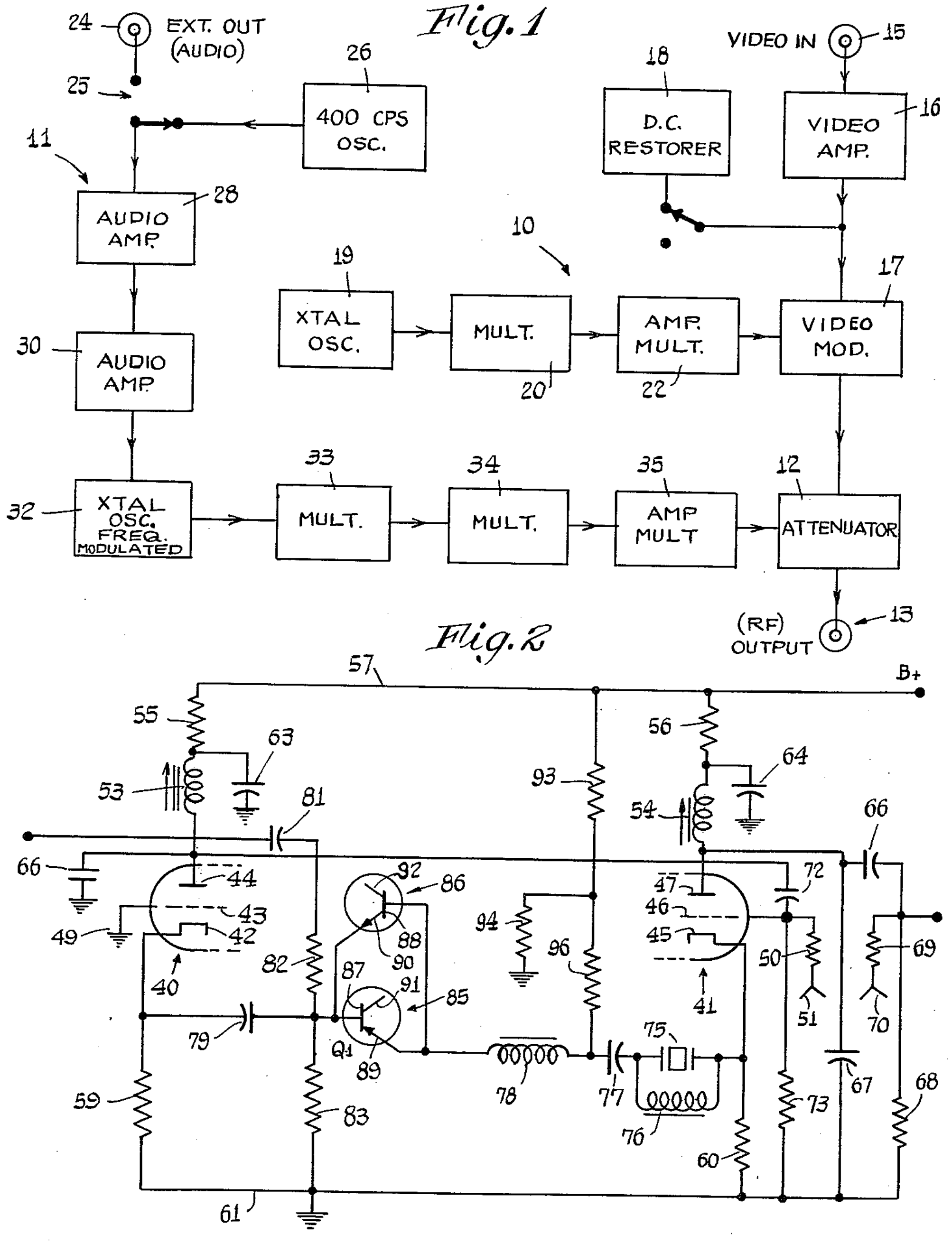
FIGURE 1 is a block diagram illustrating generally the various functional units making up the present improved television sound and picture signal generator.
FIG. 2 is a schematic circuit diagram of the frequency-modulated crystal oscillator unit employed in the block diagram of FIG. 1.

Referring first to the block diagram shown, it will be seen that the complete generator is constituted of a video section 10 and an audio section 11, the said sections having their outputs combined in an attenuator device 12 which provides a final composite output at a suitable fitting 13.

The video section 10 has an input fitting 15 leading to a video amplifier 16 which in turn feeds into a video modultaor 17. Optionally a D.C. restorer 18 may be connected with the output of the video amplifier 16, to also modify the signal which is brought to the modulator 17.

The video section also includes a crystal oscillator 19 feeding into a multiplier 20 the output of which is brought to an amplifier-multiplier 22 also feeding into the modulator 17. The output from the modulator 17 is brought to the attenuator 12, as shown.

The audio section 11 of the generator includes an input fitting 24 connected with a selector switch 25, the latter also having a connection to a built-in audio oscillator 26 which, for example, may produce signals in the range of 400 c.p.s. By means of the selector switch 25 either the built-in oscillator 26 or the input fitting 24 may be optionally connected to the input of an audio amplifier 28 feeding into a second audio amplifier 30 the output of which is brought into a novel, frequency-modulated crystal oscillator as provided by the present invention. This oscillator is numbered 32, and details of the same are shortly to be given.

The output from the frequency-modulated crystal oscillator 32 is fed through frequency multipliers 33 and 34, and through a frequency multiplier and amplifier 35 into the attenuator 12 where the signal is combined with that from the video section 10, for use by means of the fitting 13.

Referring now to FIG. 2, the novel frequency-modulated crystal oscillator unit 32 provided by the present invention is constituted of a pair of electron discharge devices 40 and 41, having cathodes 42, 45, control grids 43, 46 and anodes 44, 47 respectively. The electron discharge devices 40, 41 may be constituted with separate envelopes, or they may be included in a single envelope, the latter arrangement being shown in the circuit of FIG. 2. The discharge devices 40, 41 are connected so as to constitute a cathode-coupled oscillator which is crystal controlled. Accordingly, as shown, the grid 43 is connected to a ground 49, and the grid 46 connected for capacitive coupling to the anode 44 (as later described) and also connected through a testing resistor 50 to a fitting or jack 51 by which a connection may be effected to a vacuum tube voltmeter for purposes of alignment and adjustment of the crystal oscillator. Further details of such procedure will be given later.

From a suitable power supply a potential difference is provided between the associated cathodes and anodes, and to effect this the anodes 44 and 47 are connected respectively through variable inductances 53, 54 and drop resistors 55, 56 to a B+ supply line 57. The negative of the B supply may be connected to ground, and the cathodes 42 and 45 of the discharge devices 40, 41 may be connected respectively through cathode resistors 59 and 60 to the ground wire or bus 61. Feedthrough capacitors 63 and 64 are connected from ground to junctures of the variable inductors 53, 54 and the plate supply drop resistors 55, 56 as shown, and load circuit capacitors 66, 67 are connected from the anodes 44, 47 to the ground, completing the load circuits through the discharge devices 40, 41.

An R-C takeoff circuit is provided for the discharge device 41, comprising a coupling capacitor 66 and series resistor 68, the output being connected to the juncture of the capacitor and resistor. Such output, for example, would be obtainable at the jack 13 shown in FIG. 1. A test-point resistor 69 may be connected to the said juncture and brought out to a testing jack 70 to enable connection to be made to a vacuum tube voltmeter for alignment and adjustment purposes, as will be explained later.

The anode 44 of the discharge device 40 is connected, by means of a coupling circuit including a coupling capacitor 72 to the grid 46, and said connection is joined to a resistor 73 connected to the ground bus or wire 61, as shown.

The coupling circuit between the cathodes 42 and 45 of the discharge devices includes a piezo-electric crystal 75 bridged by an inductance 76, this parallel circuit being connected to a coupling capacitor 77 in turn connected with an inductance 78. The cathode coupling circuit further includes a second coupling capacitor 79 connected to the cathode 42, all as shown.

The audio input circuit for the oscillator is connected with the said cathode coupling circuit and includes a coupling capacitor 81 connected with divider resistors 82 and 83, the latter resistor being connected to the ground bus 61 and the juncture of the resistors being connected to the coupling capacitor 79, all as shown.

In accordance with the present invention we provide, in conjunction with the cathode-coupled resistor as above set forth, a novel variable impedance device constituted as a conductive crystal means placed in series with the piezo-electric crystal 75 in the cathode coupling circuit, thereby to effect a frequency modulation of the audio input signal in a novel and advantageous manner. Such frequency modulation is obtained, in accordance with the invention, by relatively few, simple components of small size and weight, which are reliable in their functioning and provide a high quality frequency-modulated signal in response to excitation of the oscillator by a suitable audio input signal. Such audio input signal, for example, may have a frequency range to 100 to 5,000 c.p.s.

The term "conductive crystal means" as used herein is intended to include semi-conductor crystal devices, as will be understood.

The said conductive crystal means by which the frequency modulation is effected may be constituted of one or several crystal diodes or transistors. Such devices are included in series with the piezo-electric oscillator crystal in the cathode coupling circuit, and may be further provided with an energizing current, preferably from the B+ supply represented by the power lead 57.

As shown in FIG. 2, the said conductive crystal means comprises two transistors 85 and 86, which are connected back-to-back. The transistors 85 and 86 have respectively bases 87, 88, emitters 89, 90, and collectors 91, 92. The transistor 85 is shown as being of the PNP type, whereas the transistor 86 is shown as an NPN type. The emitter 90 of the transistor 86 is connected to the base 87 of the transistor 85, and the emitter of the latter is connected to the base 88 of the transistor 86. Also, the juncture between the emitter 90 and base 87 is connected to the coupling capacitor 79 and to the juncture between the resistors 82 and 83. The connection between the base 88 and emitter 89 is connected with the inductor 78, and the conductive crystal means or device constituted of the transistors 85 and 86 is thus seen to be inserted in series in the cathode coupling circuit of the oscillator.

Further, we provide a polarity between the elements of the transistors, as follows: A pair of voltage divider resistors 93, 94 is connected between ground and the B+ supply wire 57, and the juncture between such resistors is connected by a drop resistor 96 to the cathode coupling circuit, preferably between the coupling capacitor 77 and the inductor 78. In conjunction with such circuit from the B+ supply wire 57 the resistor 83 connected on the one hand to the ground bus 61 and on the other hand to the base 87 of the transistor 85 and emitter 90 of the transistor 86 completes the polarizing circuit for the transistors.

Referring to the test points or jacks 51 and 70, when the vacuum tube voltmeter is connected with the jack 51 the variable inductor 53 is adjusted to obtain a maximum reading. With the vacuum tube voltmeter connected to the test jack 70, the variable inductor 54 is adjusted to obtain a maximum reading. The inductors 53 and 54 may be advantageously constituted as slug-tuned coils, as will be understood.

We have found that, in accordance with the present invention as embodied in the above circuits, there is readily obtainable a frequency-modulated signal of high quality which is proportional to the audio input signal and is well suited for use with the other components of the signal generator illustrated in FIG. 1. The piezo-electric crystal 75 may be readily driven or "pulled" in the circuit as set forth, and the action of the transistors or diodes 85, 86 in constituting variable impedance devices serially connected with the oscillating crystal produces a frequency modulation of desirable characteristics, well adapted for a television test signal generator. The transistors or diodes are well known to be of small size and light weight, and to require but little current which may be readily supplied from the B+ power supply for the discharge devices 40, 41. The complete frequency modulated oscillator may thus be constituted as a small and compact unit, considerably aiding in maintaining at a small figure the overall dimensions and size of the complete signal generator.

Variations and modifications may be made within the scope of the claims, and portions of the improvement may be used without others.

We claim:

1. In a signal generating apparatus, an oscillator comprising a pair of electron discharge devices each having an anode, a grid and a cathode; power-supply means providing a potential difference between each cathode and its associated anode; two cathode-anode oscillatory circuits connected respectively with said devices; a coupling circuit between the anode of one discharge device and the grid of the other discharge device; an output circuit connected to the anode of the said other discharge device; a cathode coupling circuit having in series a piezo-electric crystal directly coupled therein, said coupling circuit being connected between the cathodes of said devices; an input circuit connected to the said cathode coupling circuit; a conductive crystal device comprising a pair of transistors series connected back-to-back, said devices being connected in the said cathode coupling circuit and constituting a variable impedance therein, said input circuit being connected to feed a signal to the said conductive crystal device whereby the oscillator produces a frequency-modulated signal when a suitable audio signal is applied to the said input circuit.

2. An oscillator as in claim 1 wherein said cathode coupling circuit includes an inductance series connected with said piezo-electric crystal and said crystal device being connected in series with said inductance.

3. An oscillator as in claim 2 comprising means for applying a potential difference across the series connected inductance and crystal device.

4. An oscillator as in claim 1 comprising means applying a potential difference to points of said cathode coupling circuit disposed on opposite sides of said crystal device.

5. In a signal generating apparatus, an oscillator comprising a pair of electron discharge devices each having an anode, a grid and a cathode; power-supply means providing a potential difference between each cathode and its associated anode; two cathode-anode oscillatory circuits connected respectively with said devices; a coupling circuit between the anode of one discharge device and the grid of the other discharge device; an output circuit connected to the anode of the said other discharge device; a cathode coupling circuit having in series a piezo-electric crystal directly coupled therein, said coupling circuit being connected between the cathodes of said devices; an input circuit connected to the said cathode coupling circuit; a conductive crystal device comprising a pair of transistors connected back-to-back, said device being series connected in the said cathode coupling circuit and constituting a variable impedance therein, said input circuit being connected to the base of one of said transistors to feed a signal to the said conductive crystal device whereby the oscillator produces a frequency-modulated signal when a suitable audio signal is applied to the said input circuit.

6. An oscillator as in claim 5 comprising means causing a flow of current through said crystal device.

7. In a signal generating apparatus, an oscillator comprising a pair of electron discharge devices each having an anode, a grid and a cathode; power-supply means providing a potential difference between each cathode and its associated anode; two cathode-anode oscillatory circuits connected respectively with said devices; a coupling circuit between the anode of one discharge device and the grid of the other discharge device; an output circuit connected to the anode of the said other discharge device; a cathode coupling circuit having in series a piezo-electric crystal directly coupled therein, said coupling circuit being connected between the cathodes of said devices; an input circuit connected to the said cathode coupling circuit; a conductive crystal device comprising a pair of transistors connected back-to-back with the base and emitter of one being connected respectively to the emitter and base of the other, said device being series connected in the said cathode coupling circuit and constituting a variable impedance therein, said input circuit being connected to feed a signal to the said conductive crystal device whereby the oscillator produces a frequency-modulated signal when a suitable audio signal is applied to the said input circuit.

8. An oscillator as in claim 7 comprising a pair of supply lines including divider resistances connected to said power supply means and to points of said cathode coupling circuit located on opposite sides of said crystal device.

References Cited in the file of this patent

UNITED STATES PATENTS

| | | |
|---|---|---|
| 2,559,388 | Baldridge | July 3, 1951 |
| 2,562,311 | Goldberg | July 3, 1951 |
| 2,598,722 | Richards | June 3, 1952 |
| 2,683,252 | Gordon | July 6, 1954 |
| 2,708,739 | Bucher | May 17, 1955 |
| 2,820,199 | Greefkes | Jan. 14, 1958 |
| 2,844,795 | Herring | July 22, 1958 |
| 2,913,677 | Kosowsky et al. | Nov. 17, 1959 |
| 2,925,561 | Macdonald | Feb. 16, 1960 |